US011076592B1

(12) United States Patent
Summerfield

(10) Patent No.: US 11,076,592 B1
(45) Date of Patent: Aug. 3, 2021

(54) WILD GAME CALL WITH IMPROVED HARMONICS

(71) Applicant: MeatEater Holding Company, LLC, Bozeman, MT (US)

(72) Inventor: Abram Summerfield, Orofino, ID (US)

(73) Assignee: MEATEATER HOLDING COMPANY, LLC, Bozeman, MT (US)

( * ) Notice: Subject to any disclaimer, the term of this patent is extended or adjusted under 35 U.S.C. 154(b) by 0 days.

(21) Appl. No.: 17/174,899

(22) Filed: Feb. 12, 2021

Related U.S. Application Data

(63) Continuation of application No. 17/169,748, filed on Feb. 8, 2021, now abandoned.

(60) Provisional application No. 62/980,604, filed on Feb. 24, 2020.

(51) Int. Cl.
*A01M 31/00* (2006.01)
*G10K 11/162* (2006.01)
*G10K 15/04* (2006.01)

(52) U.S. Cl.
CPC ......... *A01M 31/004* (2013.01); *G10K 11/162* (2013.01); *G10K 15/04* (2013.01)

(58) Field of Classification Search
CPC .................................................. A01M 31/004
See application file for complete search history.

(56) References Cited

U.S. PATENT DOCUMENTS

| | | |
|---|---|---|
| 1,613,511 A | 1/1927 | Maria et al. |
| 1,771,052 A | 7/1930 | Mallory |
| 3,722,133 A | 3/1973 | Morgan |
| 3,772,823 A | 11/1973 | Herter |
| 3,803,755 A | 4/1974 | Thompson |
| 4,335,539 A | 6/1982 | Jones |
| 4,761,149 A | 8/1988 | Laubach |
| 4,976,648 A | 12/1990 | Meline |
| 5,122,088 A | 6/1992 | Meline |
| 5,582,530 A | 12/1996 | Ady |
| 5,735,725 A | 4/1998 | Primos |

(Continued)

FOREIGN PATENT DOCUMENTS

| | | |
|---|---|---|
| CA | 1108444 | 9/1981 |
| CA | 1272050 | 7/1990 |
| GB | 378403 | 8/1932 |

OTHER PUBLICATIONS

Plastic Vs Traditional Trumpets.*

(Continued)

*Primary Examiner* — Richard G Davis
(74) *Attorney, Agent, or Firm* — Kilpatrick Townsend & Stockton LLP

(57) ABSTRACT

A wild game call includes a bugle tube and a damper. The bugle tube includes a first end with a first aperture, a second end with a second aperture, and a wall extending from the first end to the second end. The wall defines an interior volume, and the first aperture and the second aperture provide access to the interior volume such that a flow path is defined through the bugle tube from the first end, through the second end, and out the second end. The bugle tube includes a metal and is configured to generate sound waves by vibrating responsive to air flowing along the flow path. The damper surrounds the outer surface of the wall of the bugle tube between the first end and the second end and may reduce unwanted ringing while improving the sound of the bugle call.

26 Claims, 12 Drawing Sheets

(56) References Cited

U.S. PATENT DOCUMENTS

| | | |
|---|---|---|
| 5,885,125 A | 3/1999 | Primos |
| 6,062,940 A | 5/2000 | Bean |
| 6,120,341 A | 9/2000 | Hafford |
| 6,231,417 B1 | 5/2001 | Palmer |
| 6,254,451 B1 | 7/2001 | Bean |
| 6,328,623 B1 | 12/2001 | Bean |
| 6,413,140 B1 | 7/2002 | Primos |
| 6,572,430 B1 | 6/2003 | Primos |
| 6,767,270 B1 | 7/2004 | Primos |
| 6,783,422 B1 | 8/2004 | Bean |
| 7,049,501 B2 | 5/2006 | Shellhammer et al. |
| 8,342,902 B2 | 1/2013 | Brown |
| 9,485,982 B2 | 11/2016 | Pribbanow |
| 9,901,091 B2 | 2/2018 | Jacobsen |
| 10,194,651 B2 | 2/2019 | Rouse |
| 10,542,741 B2 | 1/2020 | Rouse |
| 2002/0009946 A1 | 1/2002 | Primos |
| 2007/0037471 A1* | 2/2007 | Pepin .................. A01M 31/004 446/207 |
| 2011/0207380 A1 | 8/2011 | Jacobsen |
| 2012/0028536 A1 | 2/2012 | Jacobsen |
| 2014/0065924 A1 | 3/2014 | Dillon |
| 2017/0000108 A1 | 1/2017 | Bean et al. |
| 2017/0258071 A1* | 9/2017 | Jacobsen ............. A01M 31/004 |
| 2017/0280704 A1 | 10/2017 | Foster |
| 2020/0253188 A1 | 8/2020 | Lynch |

OTHER PUBLICATIONS

Rogue Bugle Tube.*
Sure Fire Bugle Adapter.*
Rocky Mountain Hunting Calls 424 ATOMIC-13 Series Mean Raspy Mid-Range Predator Call with Combination Reed and Carrying Lanyard, Amazon, Available Online at: https://www.amazon.in/Rocky-Mountain-ATOMIC-13-Mid-Range-Combination/dp/B084ZZ9WQP, Accessed from Internet on Feb. 25, 2021, 6 pages.
Rocky Mountain Wapiti Whacker Bugle: Sports & Outdoors, Amazon.com, Available Online at https://www.amazon.com/Rocky-Mountain-Wapiti-Whacker-Bugle/dp/B07BCLK6BH, Accessed from Internet on: Mar. 30, 2021, 6 pages.

* cited by examiner

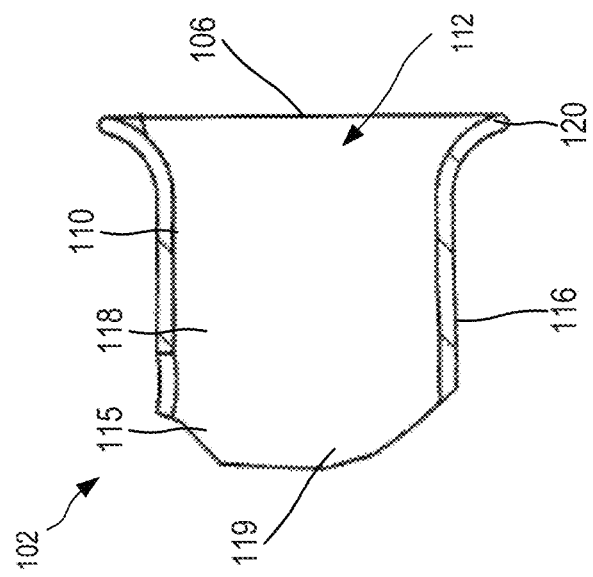
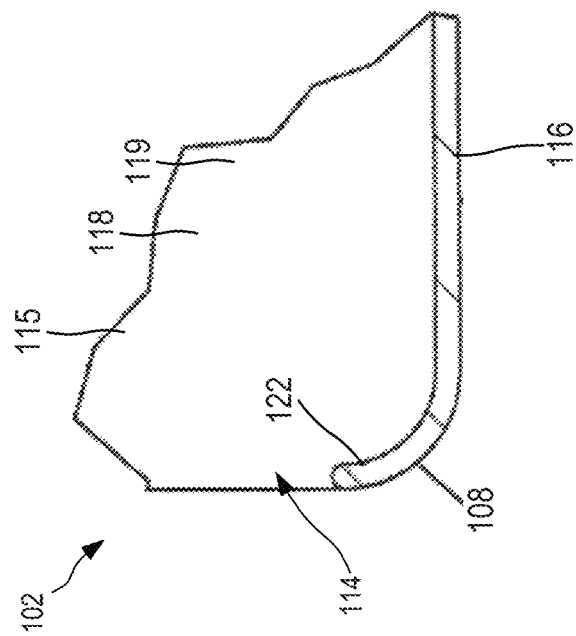
FIG. 3A
FIG. 3B

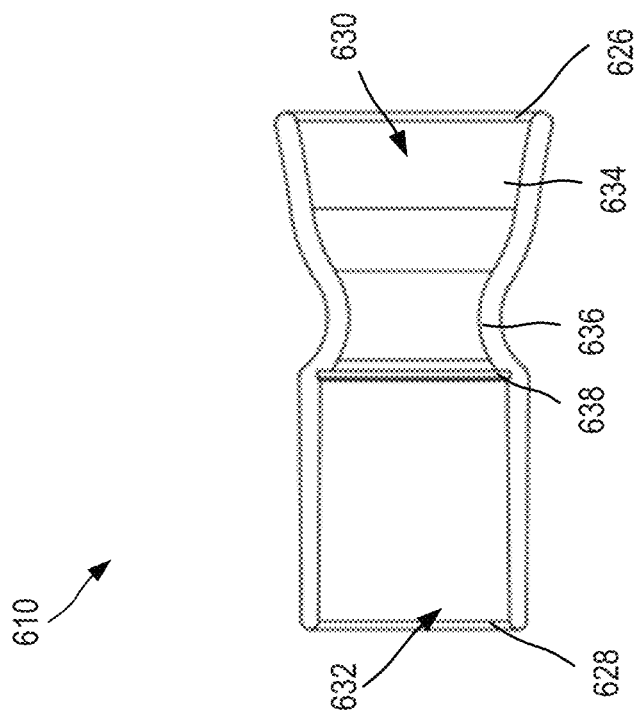
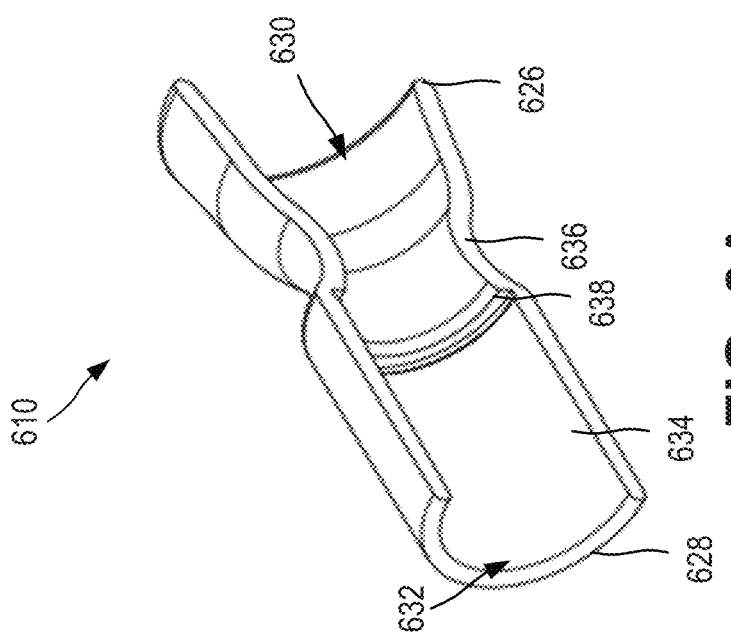
FIG. 8B
FIG. 8A

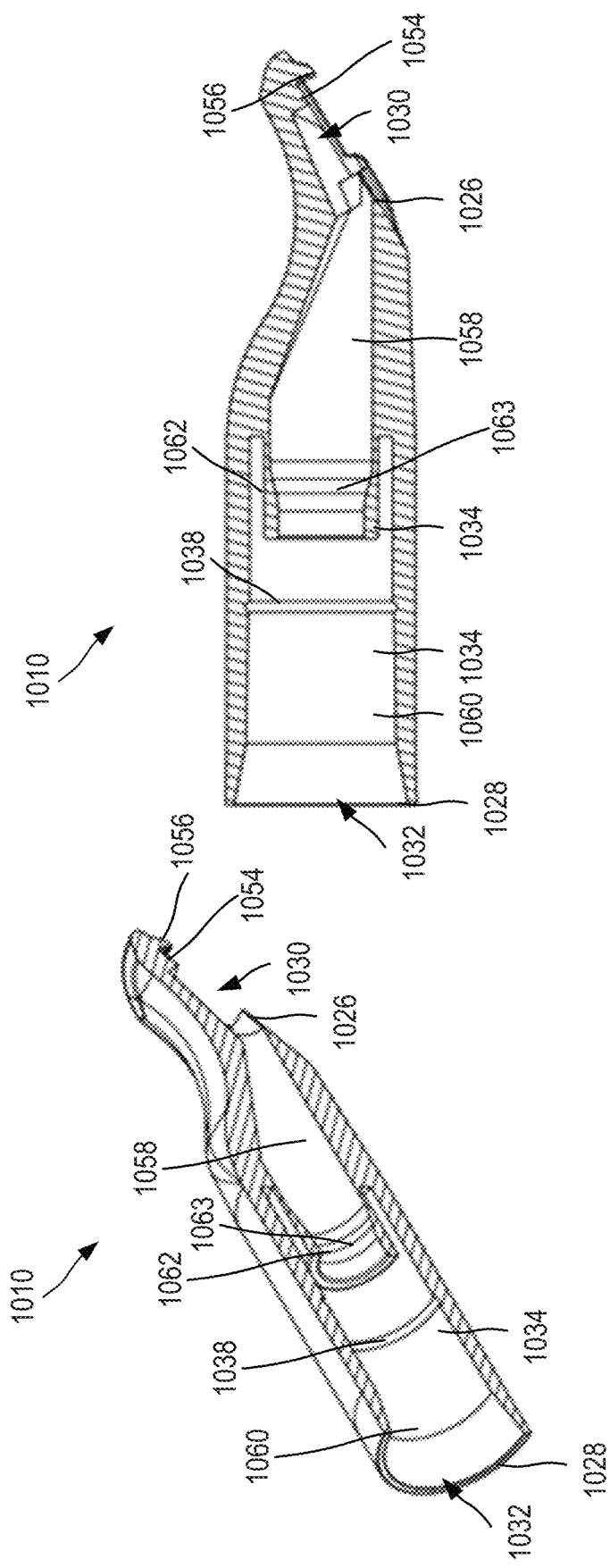

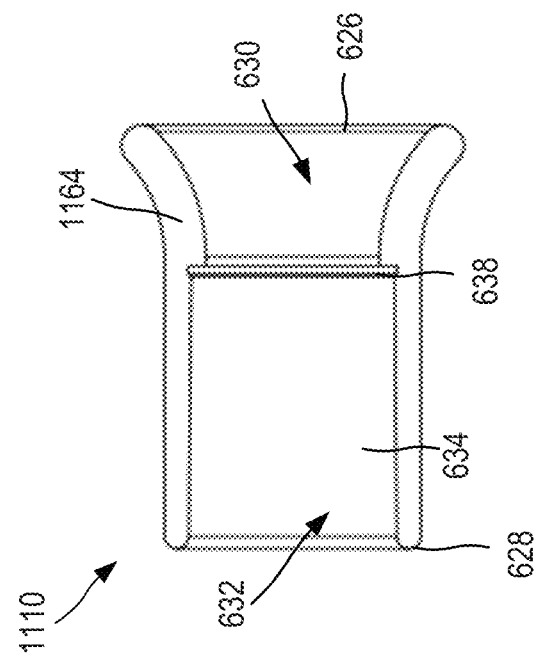
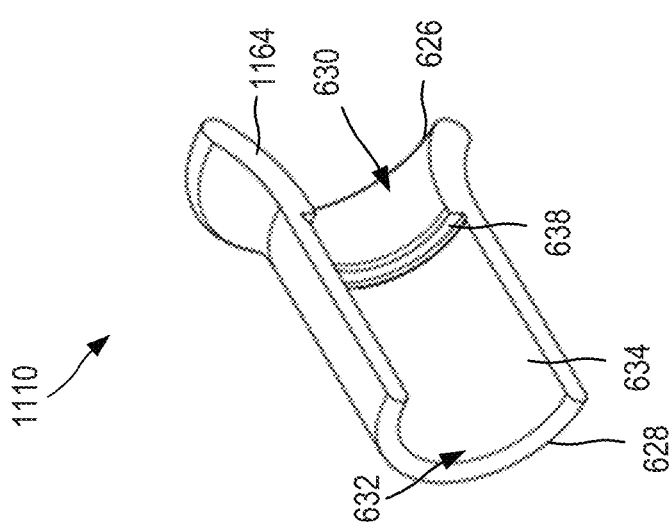
FIG. 11B
FIG. 11A

WILD GAME CALL WITH IMPROVED HARMONICS

REFERENCE TO RELATED APPLICATION

This application is a continuation of U.S. patent application Ser. No. 17/169,748, filed Feb. 8, 2021 which, claims the benefit of U.S. Provisional Patent Application No. 62/980,604, filed on Feb. 24, 2020 and entitled IMPROVED GAME CALL, the content of which is hereby incorporated by reference in its entirety.

FIELD OF THE INVENTION

This application relates to game calls, and, more specifically, to an improved game call for attracting wild game.

BACKGROUND

Game calls are often used in order to attract or locate an animal for various purposes such as hunting or wildlife observation. Different types of game calls have been designed to attract certain animals such as turkeys, deer, elk, moose, coyotes, etc. Conventional game calls includes bugle tubes that are made from rigid plastic via an injection molding process. These tubes are sized in such a way as to funnel the sounds produced by a user's mouth diaphragm (or similar call) and focus the direction of the output. Quite often, this sound is hollow and lacks depth and timbre necessary for an effective game call that mimics the natural sounds of the game sought. For example, a bull elk's vocalization has a high note (frequency) in the range of 2500 Hz, and this note is a critical aspect of a successful game call bugle. However, conventional bugle tubes constructed of plastic are only able to resonate at about 1300 Hz. This limitation makes conventional game calls unable to produce the proper sound and timbre to attract the targeted game.

SUMMARY

Embodiments covered by this patent are defined by the claims below, not this summary. This summary is a high-level overview of various embodiments and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

According to certain embodiments, a game call includes a bugle tube and a damper. The bugle tube includes a first end having a first aperture and a second end opposite from the first end and having a second aperture. In certain aspects, a greatest dimension of the second aperture is greater than a greatest dimension of the first aperture. An outer face extends from the first end to the second end. The bugle tube includes an interior volume, and the first aperture and the second aperture provide access to the interior volume such that a flow path is defined through the bugle tube from the first end, through the second end, and out the second end. In certain embodiments, the bugle tube is configured to generate sound waves by vibrating responsive to air flowing along the flow path. The bugle tube may include a metal. The damper surrounds the outer face of the bugle tube between the first end and the second end and is adapted to dampen vibrations of the bugle tube.

Various implementations described herein may include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The specification makes reference to the following appended figures, in which use of like reference numerals in different figures is intended to illustrate like or analogous components.

FIG. 3A is a sectional view of a portion of the wild game call of FIG. 1 taken from circle A in FIG. 3.

FIG. 3B is a sectional view of a portion of the wild game call of FIG. 1 taken from circle B in FIG. 3.

FIG. 8A is a sectional view of a mouthpiece of the wild game call of FIG. 6 according to various embodiments.

FIG. 8B is another sectional view of the mouthpiece of FIG. 8A.

FIG. 10A is a sectional view of a mouthpiece for a wild game call according to various embodiments.

FIG. 10B is another sectional view of the mouthpiece of FIG. 10A.

FIG. 11A is a sectional view of a mouthpiece for a wild game call according to various embodiments.

FIG. 11B is another sectional view of the mouthpiece of FIG. 11A.

DETAILED DESCRIPTION

The subject matter of embodiments is described herein with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Described herein are improved wild game calls that include a bugle tube and a damper. In certain embodiments, the wild game calls described herein may have improved harmonics compared to existing game calls, and in various embodiments, the wild game calls described herein may match the harmonic frequency of a game animal vocalization. The wild game calls described herein may be used to provide harmonics for various wild game including, but not limited to, bull elk, wolf, bull moose, and other wild game as desired. In some non-limiting embodiments, the wild game calls described herein may optionally resonate at a range greater than 1300 Hz (that of plastic bugle tubes), such as about 2250 Hz to about 2700 Hz, and such as near 2500 Hz.

In certain embodiments, the wild game calls described herein may produce a quality game call sound, with depth and timbre, and the wild game calls described herein may produce a quality game call sound for an entire call sequence. As a non-limiting example, the wild game calls may produce a game call sound from the starting growl, to the high pitch note, and then to chuckles to end the sequence. In some embodiments, the wild game calls described herein may maximize the volume (amplitude) of the sound produced while also being easy to use and avoiding and/or minimizing user strain (e.g., vocal strain, airflow strain, etc.). In some embodiments, the wild game calls described herein may reduce and/or eliminate unwanted and/or unnatural ringing, thereby improving the sound of the bugle call.

FIGS. 1-4 illustrate an example of a wild game call 100 according to various embodiments. The wild game call 100 includes a bugle tube 102 at least partially encased in a damper 104. In certain embodiments, the wild game call may 100 may include a mouthpiece that is attachable or connectable to the bugle tube 102, although in other embodiments and as discussed below, the bugle tube 102 itself may define a mouthpiece.

Figure 1:
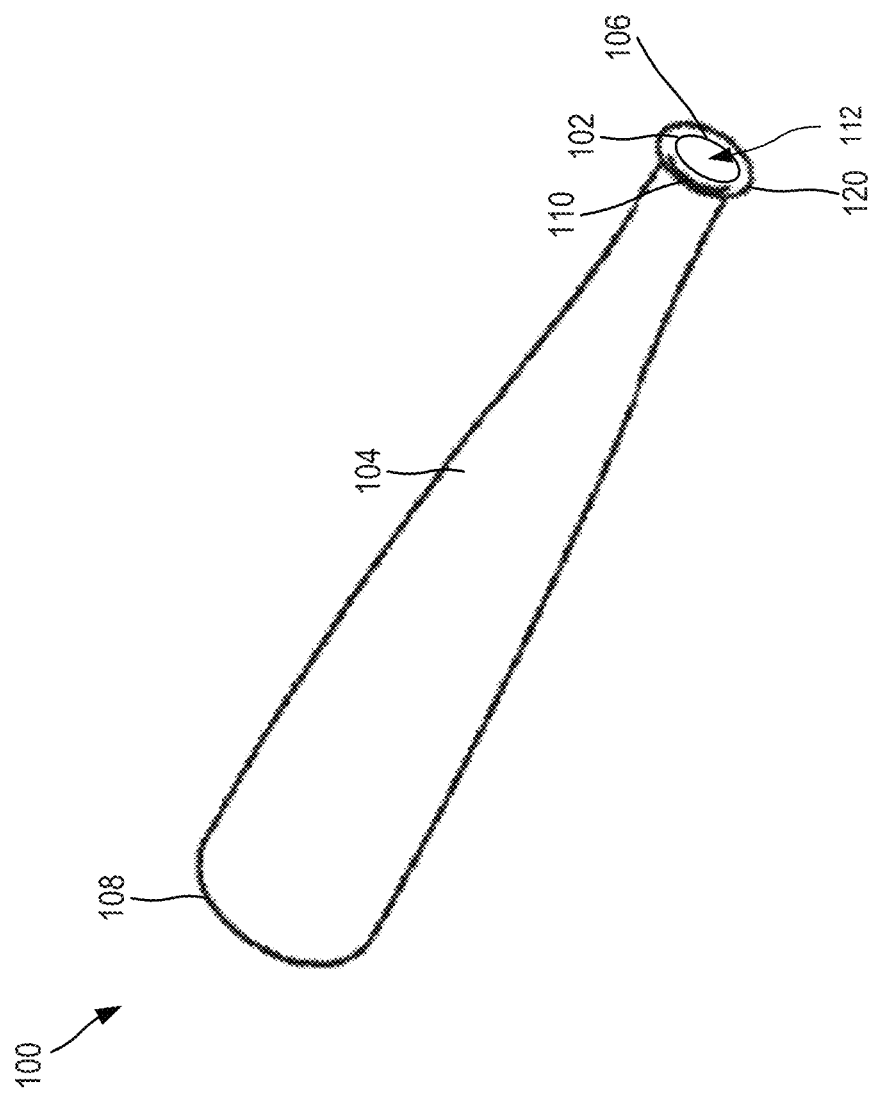
FIG. 1 is a perspective view of a wild game call according to various embodiments.
Figure 2:
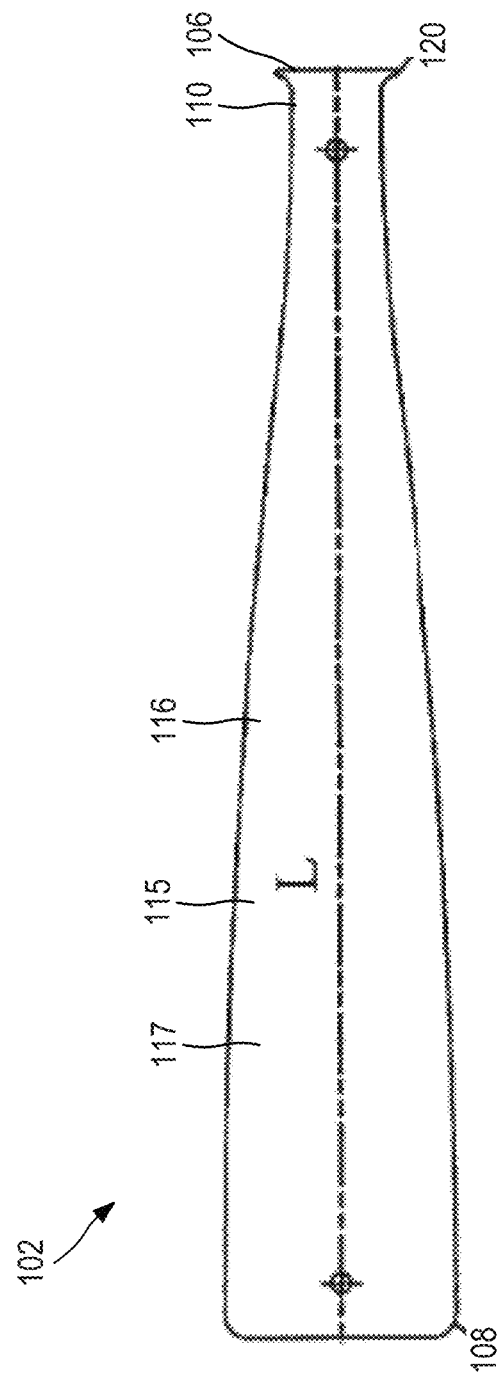
FIG. 2 is an elevation view of the wild game call of FIG. 1.
Figure 3:
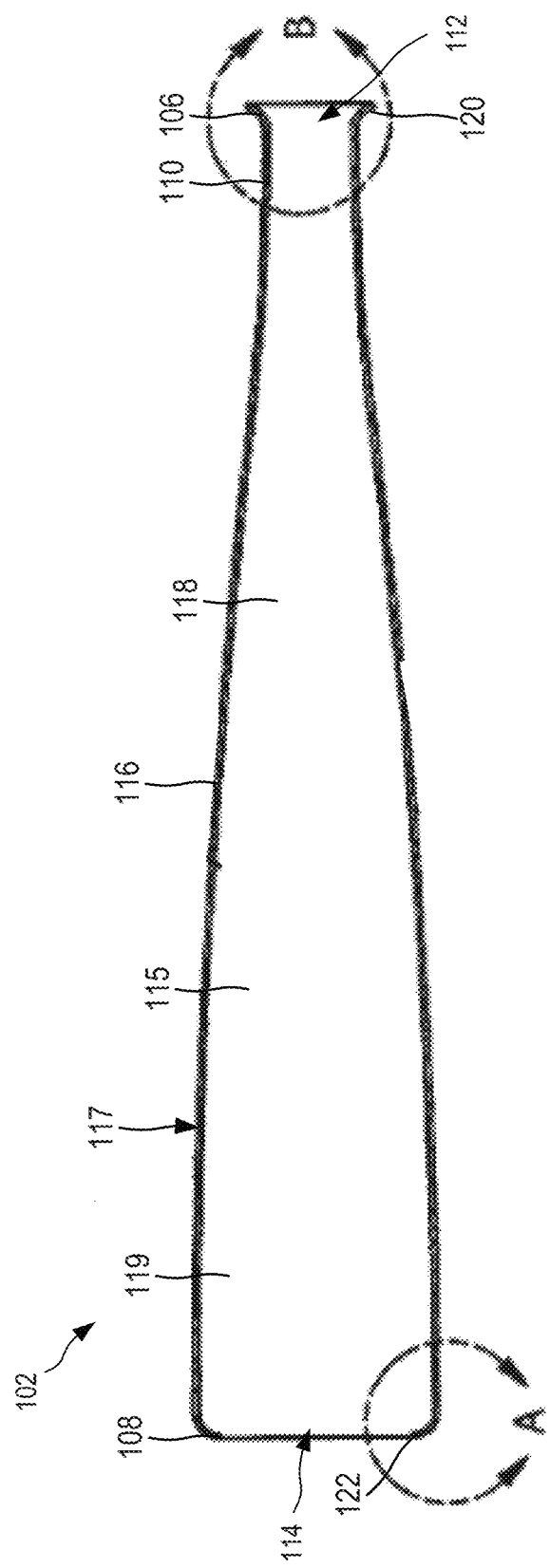
FIG. 3 is a sectional view of the bugle tube of the wild game call of FIG. 1 in isolation.

As best seen in FIG. 3, the bugle tube 102 is an elongated tube with a first end 106 and a second end 108 opposite from the first end 106. A central portion 116 connects the first end 106 to the second end 108. The central portion 116 is formed by a bugle wall 115 having a thickness, an outer surface 117, and an inner surface 119 that defines an interior cavity or volume 118 of the bugle tube 102. A distance from the first end 106 to the second end 108 is a length L of the bugle tube 102 (see FIG. 2). In certain embodiments, the length L is optionally at least 14 inches, and in some optional embodiments, the length may be 16 inches. In some embodiments, the length L may be from about 14 inches to about 22 inches, such as from about 16 inches to about 20 inches, such as from about 15 inches to about 18 inches, such as about 16 inches to about 19 inches, such as about 16 inches to about 18 inches (all inclusive). However, in other embodiments, the bugle tube 102 may have other lengths as desired. In certain embodiments, the length L of the bugle tube 102 may depend on desired natural sounds that the wild game call 100 is adapted to mimic.

The first end 106 includes a first end aperture 112 and the second end 108 includes a second end aperture 114. The apertures 112, 114 provide access to the interior volume 118 of the bugle tube 102 such that a flow path for air is defined through the bugle tube 102 from the first end aperture 112, through the interior volume 118, and out the second end aperture 114.

Each of the first end 106 and the second end 108 has an outer dimension and an inner dimension (the inner dimension being defined by the first and second end apertures 112, 114). Unless otherwise specified, the outer dimensions described herein do not include the damper (i.e., the damper would increase the outer dimension). Each of the outer and inner dimension can be, but does not have to be, a cross-wise dimension, such as, but not limited to, a diameter, a height, or a width. For purposes of this disclosure, "dimension" and "diameter" are used interchangeably. In some embodiments, the inner dimension and the outer dimension of the first end 106 is less than the inner dimension and outer dimension of the second end 108. However, such might not always be the case in all embodiments in that each of the inner and outer dimensions of the first end 106 could be the same or greater than either or both the inner and outer dimensions of the second end 108. The inner and outer dimensions of the central portion 116 (the inner dimension being defined by a cross-section of the interior volume 118 and the outer dimension being defined by the outer surface 117) may be the same, less than, or greater than those of the first end 106 and/or second end 108 and may vary along the length L of the bugle tube 102. In some embodiments, both the inner and outer dimensions of the central portion 116 are greater than the inner and outer dimensions at the first end 106 but less than the inner and outer dimensions at the second end 108. In certain embodiments, the outer dimension at the second end 108 is the greatest outer dimension of the bugle tube 102 along its length L.

The inner dimension of the first end 106 is controlled to provide adequate back pressure to the user, which may help to ensure that the user's mouth diaphragm call will function properly and produce a clean sound. In some non-limiting examples, the inner dimension of the first end 106 is from about 0.5 inches to about 1.5 inches, inclusive; from about 0.75 inch to about 1.25 inches, inclusive; and/or about 1 inch. In some non-limiting examples, the inner dimension of the second end 108 is from about 2 inches to about 3.5 inches, inclusive; from about 2 inches to about 3 inches, inclusive; from about 2 inches to about 2.5 inches, inclusive, and/or about 2.25 inches. In other embodiments, the inner dimensions of the first end 106 and/or the second end 108 may have other dimensions as desired.

Optionally, and as best illustrated in FIGS. 3 and 3B, the first end 106 may include a first end lip 120. In some embodiments, the first end lip 120 is flared outwards. In certain embodiments, the outer dimension of the first end 106 (defined by the first end lip 120) is less than the outer dimension at the second end 108. In some non-limiting embodiments, the outer dimension at the first end 106 is from about 0.5 inches to about 2 inches, inclusive; from about 1 inch to about 2 inches, inclusive; and/or about 1.5 inches. In one non-limiting example, the outer dimension at the first end 106 is about 1.5 inches and the inner dimension at the first end 106 is about 1 inch.

In certain embodiments, when the first end lip 120 is included, the first end lip 120 may define a location that supports lips of a user and/or may otherwise define the mouthpiece portion 110. In other embodiments, discussed below, a separate mouthpiece may be attached or otherwise connected to the bugle tube 102 at the first end 106.

Optionally, and as best illustrated in FIGS. 3 and 3A, the second end 108 may include a second end lip 122. In various embodiments, the second end lip 122 may be rolled inwards. In some non-limiting embodiments, the outer dimension at the second end 108 is about 2 inches to about 4 inches, inclusive, from about 2.5 inches to about 4 inches, inclusive; from about 2.5 inches to about 3.5 inches, inclusive; and/or about 3 inches. In one non-limiting example, the outer dimension at the second end 108 is about 3 inches and the inner dimension at the second end 108 is about 2.25 inches.

The bugle tube 102 may be constructed from various materials that vibrate responsive to air flowing along the air path to generate sound waves. In certain embodiments, the bugle tube 102 may be constructed from a metal. Various metals suitable for the bugle tube 102 may include, but are not limited to, aluminum, aluminum alloys, brass, copper, copper alloys, combinations thereof, or other suitable metals as desired. In certain embodiments, the bugle tube 102 is constructed of a material to match harmonics of wild game vocalization. In one non-limiting embodiment, the bugle tube is constructed from a 6061 aluminum alloy. In some embodiments, the bugle tube 102 is formed integrally. In other embodiments (described below), separate accessories can be added to the bugle tube 102. In some non-limiting examples, the bugle tube 102 may be formed via an impact extrusion process (e.g., extruding the metal tube and then compressing it to shape it as desired), although other suitable processes may be utilized in certain embodiments, the bugle tube 102 may be seamless.

As mentioned, the inner surface 119 of the bugle wall 115 defines the interior volume 118 between the first end 106 and the second end 108. In certain embodiments, the interior volume 118 comprises a geometry such that the bugle tube vibrates at various frequencies. In some embodiments, the geometry of the interior volume 118 produces a frequency node of about 2500 Hz. In some embodiments, the diameter of the first end aperture 112, the diameter of the second end aperture 114, the geometry of the interior volume 118, the length L, and/or the thickness of the bugle wall 115 are controlled to balance the effects of acoustic resonance and the harmonics of the air volume contained within the bugle tube 102 during use such that the bugle tube 102 vibrates at various frequencies.

Figure 4:
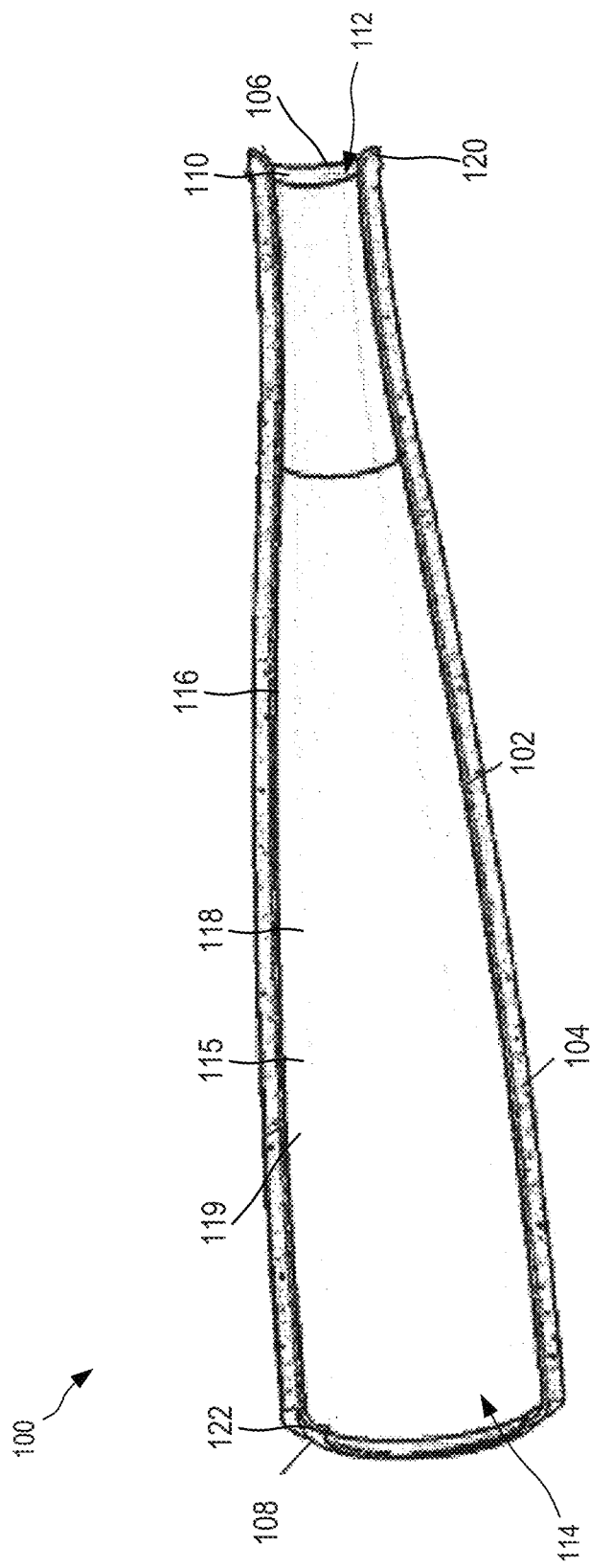
FIG. 4 is a sectional view of the wild game call of FIG. 1.

As best illustrated in FIG. 4, the damper 104 is provided along all or a portion of the outer surface 117 of the bugle wall 115 between the first end 106 and the second end 108. The damper 104 may be provided from proximate the first end 106 to proximate the second end 108. In certain embodiments, and as illustrated in FIG. 4, the damper 104 may be provided along the entirety of the outer surface 117 of the bugle wall 115 and along the entire length L of the bugle tube 102 from the first end 106 to the second end 108. In other embodiments, the damper 104 need not be provided around the entirety of the bugle tube 102 (e.g., portions of the outer surface 117 may not be covered by the damper 104).

The damper 104 is an acoustic damper that may reduce unwanted ringing (and/or other unnatural sounds from the bugle tube 102) without altering the sound of the bugle tube 102 produced by the user. In certain embodiments, in addition to providing acoustic dampening, the damper 104 may also provide a protective layer to the bugle tube 102 that may minimize or prevent potential damage to the bugle tube 102 when used (e.g., when struck with sticks or hard objects) and/or may minimize potential unwanted ringing when the bugle tube 102 is struck, which can repel game.

In some embodiments, the damper 104 may be various suitable materials including, but not limited to rubber (e.g., spray-on rubber, roll-on rubber, etc.), foam (e.g., closed cell polyethylene foam, etc.), combinations thereof, or other suitable materials as desired. In some non-limiting embodiments, the damper 104 may be a soft foam wrap that is placed on some or all of the outer surface 117 of the bugle tube 102. In some cases, the damper 104 may have a thickness between about ⅛ inch and ½ inch, inclusive; between about ⅛ inch and ¼ inch, inclusive; and/or about 3/16 inch. In one non-limiting embodiment, the damper 104 may be a closed cell polyethylene foam that is 3/16 inch thick. In some cases, when the damper 104 is a rubber material, the damper 104 may be relatively soft and have a Shore-A hardness of from 0-60, such as a Shore-A hardness of from 30-50.

Figure 5:
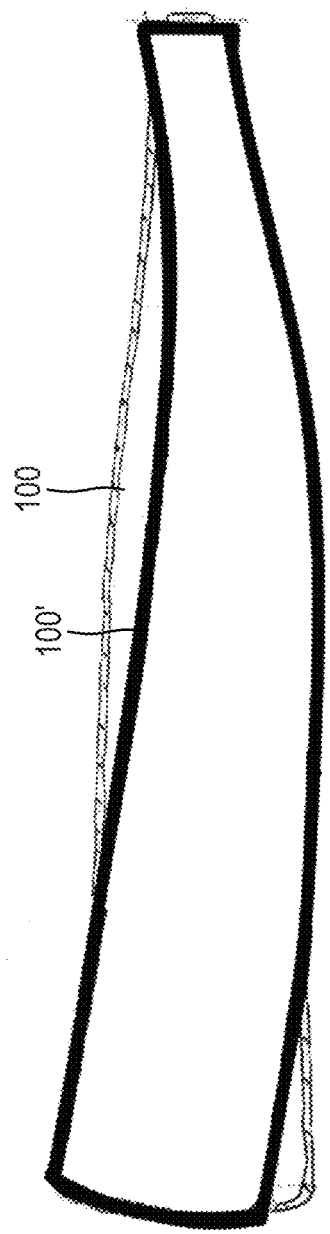
FIG. 5 is a side view of the wild game call of FIG. 1 showing the tube's deflection at a resonant frequency.

As illustrated in FIG. 5, at desired harmonic frequencies, the bugle tube 102 will resonate near the desired frequency, such as near 2500 Hz. At lower frequencies, other aspects of a wild game vocalization may be attained with the bugle tube 102, such as the introductory growl, the lead up to high pitch note, and the chuckles at the end FIG. 5 illustrates the bugle tube 102 in a non-simulated position and the bugle tube 102' displaced (exaggerated in FIG. 5 to show the deflection) during a simulated excitation at a resonance.

Figure 6:
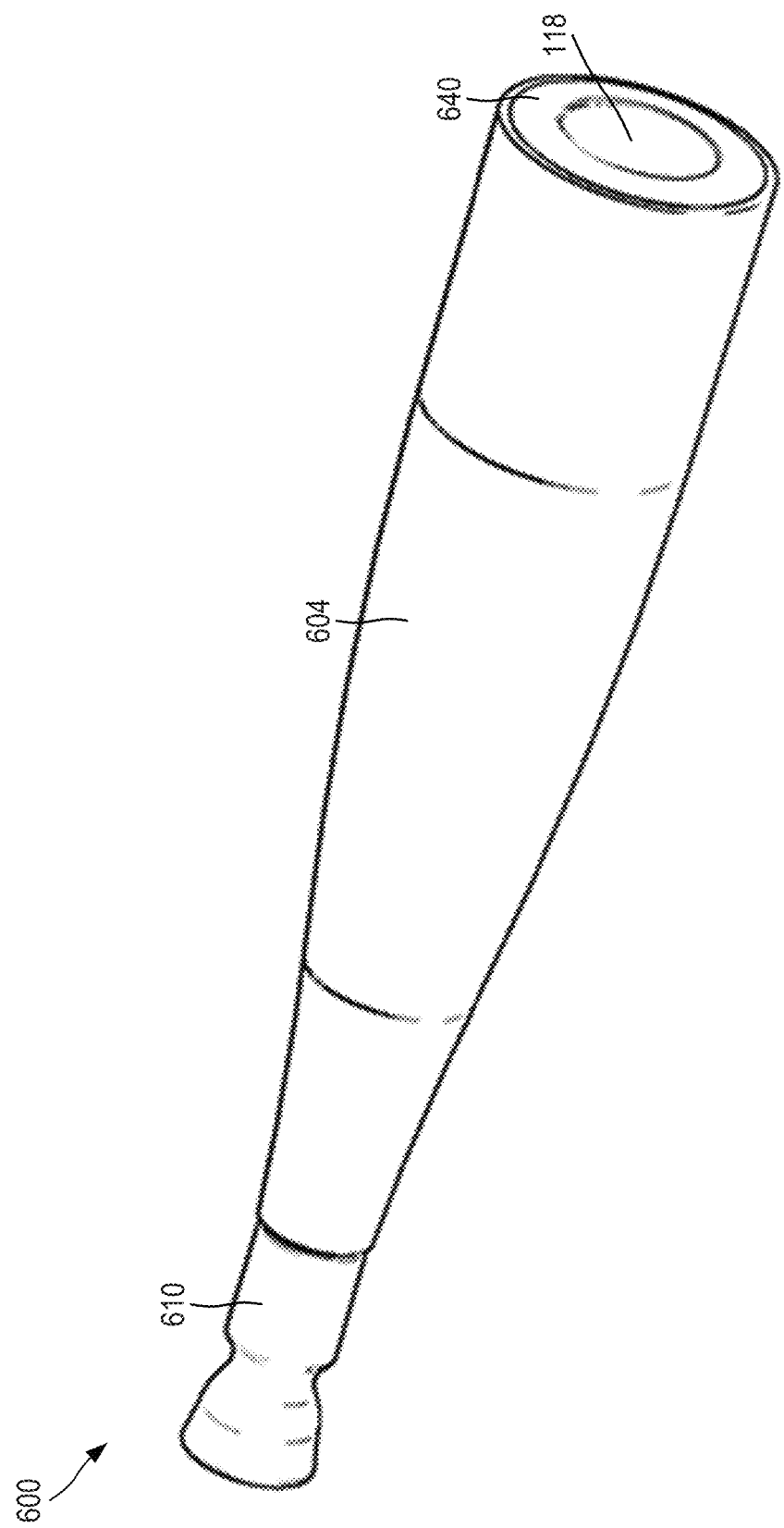
FIG. 6 is a perspective view of a wild game call according to various embodiments.
Figure 7:
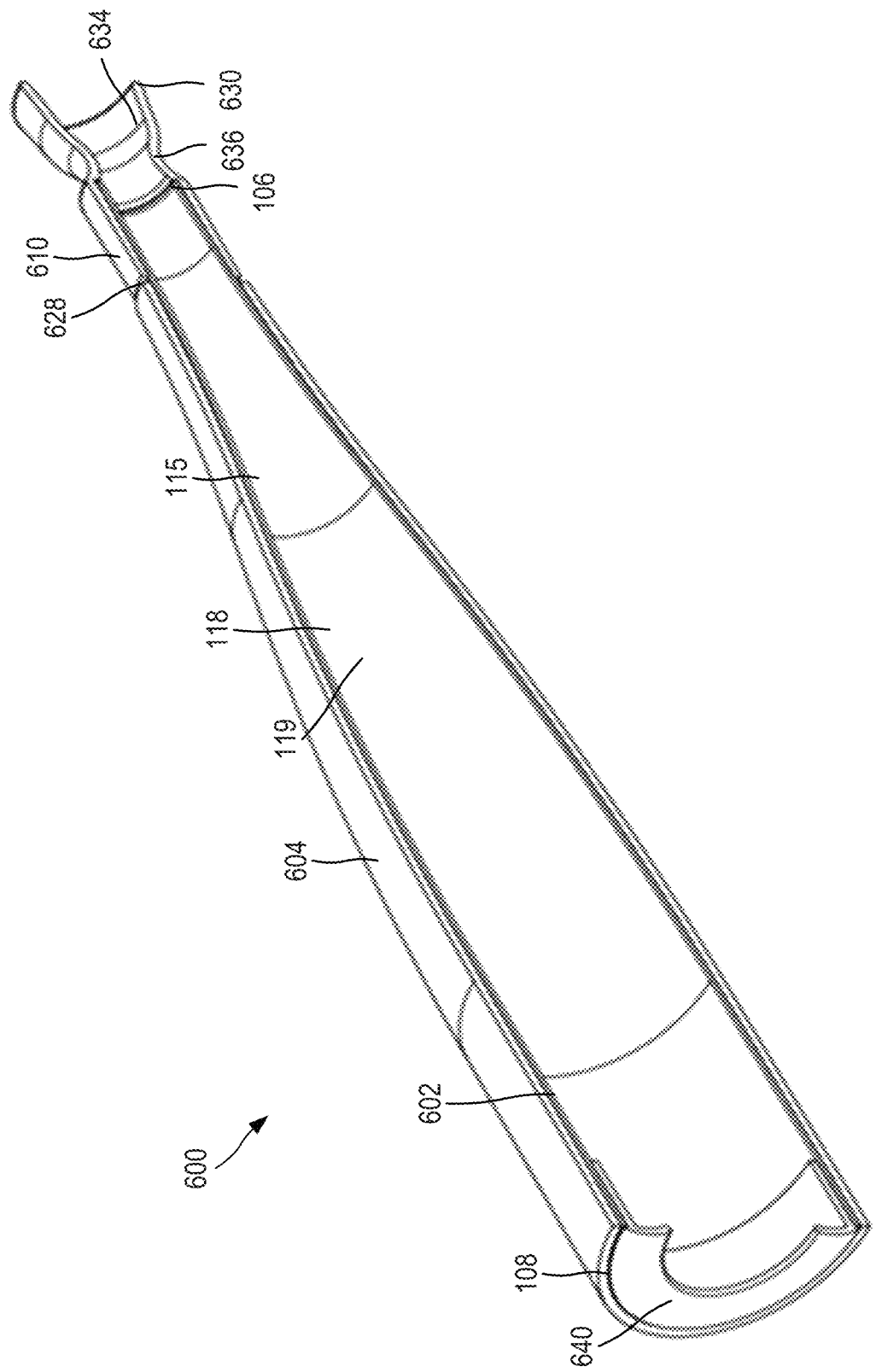
FIG. 7 is a sectional view of the wild game call of FIG. 6.

FIGS. 6, 7, 8A-B, and 9A-B illustrate other features of a wild game call 600 according to various embodiments. The wild game call 600 is substantially similar to the wild game call 100 and includes a bugle tube 602 and a damper 604. The bugle tube 602 is substantially similar to the bugle tube 102 except that the bugle tube 602 does not include the lips 120, 122. The damper 604 is substantially similar to the damper 104 except that the damper 604 does not extend along the entire length L of the bugle tube 602; instead, a portion of the bugle tube 602 proximate to the first end 106 is not covered by the damper 604. As best illustrated in FIG. 7, in certain embodiments, the portion of the bugle tube 602 that is not covered by the damper 604 may optionally receive a mouthpiece 610.

Compared to the wild game call 100, the wild game call 600 includes a separate mouthpiece 610 that is permanently or removably attached to the first end 106. While the mouthpiece 610 is shown positioned over the outer surface 117 of the bugle wall 115, in other embodiments a portion of the mouthpiece 610 could be inserted into the first end aperture 112. Regardless, use of a removable mouthpiece 610 permits interchangeability such that the wild game call 600 can be customized as desired. In this way, the bugle tube 602 is universal in that it can receive mouthpieces 610 of myriad different shapes and geometries to effectuate the desired sound from the wild game call 600. In some cases, the mouthpiece 610 may be constructed from a non-metallic material including but not limited to plastic, although it need not be in other embodiments. Rather, the mouthpiece 610 may be formed of metal (including the same metals disclosed above for forming the bugle tube 102). As best illustrated in FIGS. 7, 8A, and 8B, in certain embodiments, the mouthpiece 610 includes a first end 626 and a second end 628 opposite from the first end 626. The first end 626 includes a first end aperture 630, the second end 628 includes a second end aperture 632, and a central cavity 634 extends from the first end aperture 630 to the second end aperture 632. In the illustrated embodiment, the second end 628 of the mouthpiece 610 receives the first end 106 of the bugle tube 602 such that a portion of the bugle tube 602 is positioned within the mouthpiece 610. In the illustrated embodiment, the second end 628 of the mouthpiece 610 is proximate to or even abuts the damper 604 on the bugle tube 602.

In certain embodiments, the mouthpiece 610 has an intermediate portion 636 between the first end 626 and the second end 628. In some embodiments, the mouthpiece 610 between the intermediate portion 636 and the first end 626 may define a location that may support the user's lips and/or mouth as desired when used. In certain embodiments, an inner dimension of the intermediate portion 636 may be less than an inner dimension of the first end 626 and/or second end 628. In other words, the inner surface of the mouthpiece 610 may taper inwardly along a portion of its length such that the intermediate portion 636 defines a smallest inner dimension of the mouthpiece 610. Narrowing of the central cavity 634 in this way may provide increased back pressure to the user's mouth diaphragm when used.

In certain embodiments, the intermediate portion 636 includes a shoulder portion 638 that may selectively abut and/or otherwise engage the first end 106 of the bugle tube 602 when the mouthpiece 610 is assembled with the wild game call 600. In certain embodiments, the shoulder portion 638 may aid in retaining the mouthpiece 610 on the bugle tube 602 and/or may optionally provide a positive auditory or tactile feedback when the mouthpiece 610 is correctly positioned on the bugle tube 602. As best illustrated in FIG. 7, when assembled, at least a portion of the bugle tube 602 proximate to the first end 106 extends through the second end aperture 632 and into the central cavity 634.

Compared to the wild game call 100, the wild game call 600 can also include an end cap 640 that is permanently or removably attached to the second end 108 of the bugle tube 602. In certain embodiments, and as best illustrated in FIGS. 6 and 7, the end cap 640 is at least partially positionable within the second end aperture 114 of the bugle tube 602. In some embodiments, the end cap 640 is removably attached to the bugle tube 602 such that the wild game call 600 can be assembled with the desired type of end cap 640. In some cases, the end cap 640 may be constructed from a non-metallic material including but not limited to plastic, although it need not be in other embodiments. Rather, the end cap 640 may be formed of metal (including the same metals disclosed above for forming the bugle tube 102).

Figure 9B:
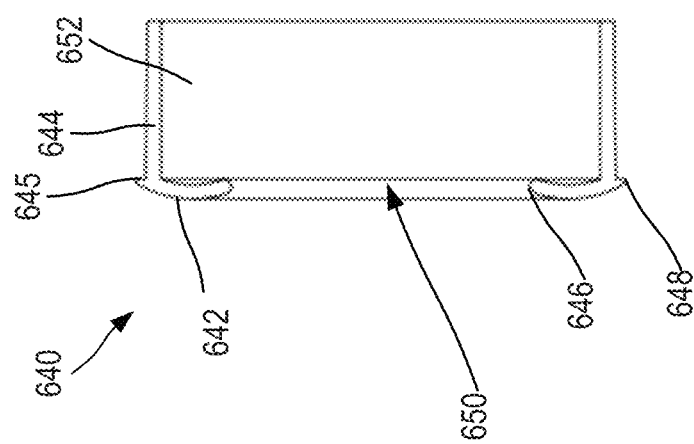
FIG. 9B is another sectional view of the end cap of FIG. 9A.
Figure 9A:
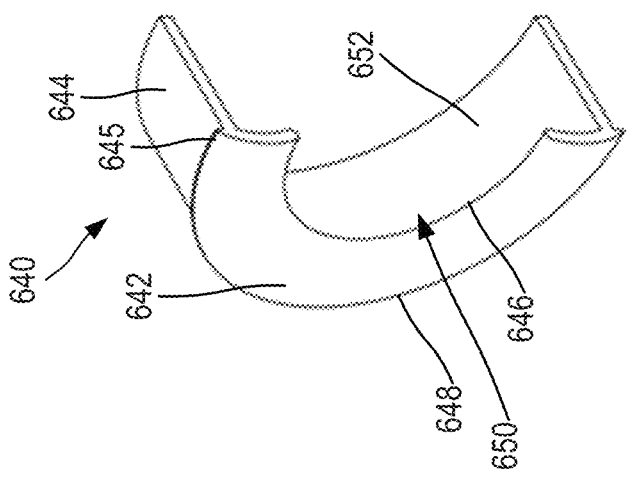
FIG. 9A is a sectional view of an end cap of the wild game call of FIG. 6 according to various embodiments.

As best illustrated in FIGS. 9A-B, in various embodiments, the end cap 640 includes a flange 642 and a sidewall 644 extending from the flange 642. In some embodiments, the flange 642 defines one end of the end cap 640 and the portion of the sidewall 644 distal the flange 642 defines an opposing end of the end cap 640. A central cavity 652 extends between the ends of the end cap 640. In certain embodiments, the flange 642 has an inner perimeter 646 and an outer perimeter 648, and the sidewall 644 extends from the flange 642 at a location between the inner perimeter 646 and the outer perimeter 648. This creates a ledge 645 on the underside of the flange 642. In certain embodiments, and as best illustrated in FIG. 7, when the end cap 640 is assembled with the bugle tube 602, the sidewall 644 is positioned within the interior volume 118 through the second end aperture 114. In the illustrated embodiment, the dimension of the outer perimeter 648 is greater than the inner dimension of the second end aperture 114 such that the flange 642 serves as a stop to prevent the end cap 640 from being inserted too far within the bugle tube 602. More specifically, when the end cap 640 is positioned on the bugle tube 602, the second end 108 of the bugle tube 602 abuts the ledge 645, which prevents further insertion of the end cap 640.

In various embodiments, the inner perimeter 646 defines an end cap aperture 650. The size of the end cap aperture 650 should not be considered limiting on the disclosure. In certain embodiments, a dimension of the end cap aperture 650 is less than the inner dimension of the second end 108 (i.e., less than the inner dimension of the second end aperture 114), although it need not be in other embodiments. In certain embodiments, the size and/or shape of the end cap aperture 650 may be controlled such that the wild game call 600 can produce various harmonics as desired. In various embodiments, the size and/or shape of the end cap aperture 650 may be controlled to control the back pressure to the user, and different sized end cap apertures 650 may provide different levels of back pressure to the user.

While discussed as separate components, in other embodiments the mouthpiece 610 and/or the end cap 640 may be integrally or monolithically formed with the bugle tube 602 as a single component. Compared to the wild game call 100, the wild game call 600 may allow for increased customization of the wild game call 600 to achieve different acoustic effects as desired.

FIGS. 10A-B illustrate another example of a mouthpiece 1010 according to various embodiments that can be used with a wild game call discussed herein. The mouthpiece 1010 may be a separate component or may be integrally formed with the wild game calls discussed herein. In some cases, the mouthpiece 1010 may be constructed from a non-metallic material including but not limited to plastic, although it need not be in other embodiments. Rather, the mouthpiece 1010 may be formed of metal (including the same metals disclosed above for forming the bugle tube 102).

Similar to the mouthpiece 610, the mouthpiece 1010 includes a first end 1026 and a second end 1028. The first end 1026 includes a first end aperture 1030, the second end 1028 includes a second end aperture 1032, and a central cavity 1034 extends from the first end aperture 1030 to the second end aperture 1032. Compared to the mouthpiece 610, and as best illustrated in FIG. 10B, the first end 1026 extends at a non-zero angle relative to the second end 1028 such that the ends 1026, 1028 are not parallel (i.e., a central axis through the first end aperture 1030 is not parallel to a central axis through the second end aperture 1032).

In certain aspects, the first end 1026 includes a diaphragm support 1054 that selectively retains a diaphragm (not illustrated) on the mouthpiece 1010. In certain embodiments, the diaphragm support 1054 includes an attachment portion 1056 that is configured to overlap a portion of the diaphragm frame and/or otherwise selectively retain and/or attach a diaphragm on the mouthpiece 1010. In some embodiments, different diaphragms can be snap-fit into or onto the first end 1026 using the diaphragm support 1054. In other embodiments, various other features or components may be utilized as the attachment portion 1056. In certain embodiments, the diaphragm support 1054 may position the diaphragm relative to the mouthpiece 1010 and/or may allow for the user to attach different types of diaphragms on the mouthpiece 1010 as desired.

In some embodiments, the central cavity 1034 of the mouthpiece 1010 includes a first portion 1058 and a second portion 1060. In certain aspects, the dimension of the second portion 1060 is greater than the dimension of the first portion 1058. In some cases, the first portion 1058 and the second portion 1060 may provide improved back pressure to the user and/or the diaphragm supported on the diaphragm support 1054 when used. Optionally, the first portion 1058 includes a collar 1062 that extends into the second portion 1060 of the central cavity 1034. The collar 1062 includes an aperture 1063 that extends through the length of the collar 1062 so as to connect the central cavity 1034 of the first portion 1058 and the second portion 1060. In some embodiments, the dimension of the aperture 1063 narrows from the first portion 1058 to the second portion 1060 so as to constrict air flow through the collar 1062. This may also provide improved back pressure to the user and/or the diaphragm supported on the diaphragm support 1054. Similar to the mouthpiece 610, the mouthpiece 1010 may include a shoulder portion 1038 that may selectively abut and/or otherwise engage the first end 106 of the bugle tube 602 when the mouthpiece 1010 is assembled with the wild game call.

FIGS. 11A-B illustrate another example of a mouthpiece 1110 according to various embodiments that can be used with the wild game calls discussed herein. The mouthpiece 1110 may be a separate component or may be integrally formed with the wild game calls discussed herein. In some cases, the mouthpiece 1110 may be constructed from a non-metallic material including but not limited to plastic, although it need not be in other embodiments. Rather, the mouthpiece 1110 may be formed of metal (including the same metals disclosed above for forming the bugle tube 102).

The mouthpiece 1110 is substantially similar to the mouthpiece 610 except that the mouthpiece 1110 does not include the intermediate portion 636 with the reduced diameter. In certain embodiments, the mouthpiece 1110 includes a lip support ring 1164 having an increased thickness. In embodiments where the lip support ring 1164 is made from a polymeric or other non-metallic material, the lip support ring 1164 may protect the user's lips against cold/freezing conditions where skin contact with a metal tube may be undesirable.

A collection of exemplary embodiments are provided below, including at least some explicitly enumerated as "Illustrations" providing additional description of a variety of example embodiments in accordance with the concepts described herein. These illustrations are not meant to be mutually exclusive, exhaustive, or restrictive; and the disclosure not limited to these example illustrations but rather encompasses all possible modifications and variations within the scope of the issued claims and their equivalents.

The above-described aspects are merely possible examples of implementations, merely set forth for a clear understanding of the principles of the present disclosure. Many variations and modifications may be made to the above-described embodiment(s) without departing substantially from the spirit and principles of the present disclosure. All such modifications and variations are intended to be included herein within the scope of the present disclosure, and all possible claims to individual aspects or combinations of elements or steps are intended to be supported by the present disclosure. Moreover, although specific terms are employed herein, as well as in the claims that follow, they are used only in a generic and descriptive sense, and not for the purposes of limiting the described embodiments, nor the claims that follow.

That which is claimed:

1. A game call comprising:
    a bugle tube comprising:
        a first end comprising a first aperture;
        a second end opposite from the first end and comprising a second aperture;
        a bugle wall extending from the first end to the second end and comprising an inner surface and an outer surface, wherein the inner surface defines an interior volume, wherein the first aperture and the second aperture provide access to the interior volume, wherein a flow path is defined through the bugle tube from the first end, through the interior volume, and out the second end, and wherein the bugle tube is configured to generate sound waves by vibrating responsive to air flowing along the flow path, wherein the bugle wall is formed of a metal; and
    a damper surrounding at least a portion of the outer surface of the bugle wall between the first end and the second end of the bugle tube, wherein the damper is adapted to dampen vibrations of the bugle tube in use, wherein the game call comprises a resonance frequency near 2500 Hz.

2. The game call of claim 1, wherein the bugle wall is formed of at least one of aluminum, brass, or copper.

3. The game call of claim 1, wherein the damper comprises a rubber or foam material.

4. The game call of claim 1, wherein the damper surrounds the entire outer surface of the bugle wall.

5. The game call of claim 1, wherein a distance from the first end to the second end defines a length of the bugle tube, and wherein the length of the bugle tube is from about 14 inches to about 22 inches.

6. The game call of claim 1, wherein the second end of the bugle tube comprises an outer dimension defined by the outer surface of the bugle wall at the second end and an inner dimension defined by the second aperture, and wherein the inner dimension is between 2 to 3 inches, inclusive, and wherein the outer dimension is between 2.5 to 4 inches, inclusive.

7. The game call of claim 1, wherein the bugle wall proximate the first end of the bugle tube flares outwardly to define a lip.

8. The game call of claim 1, wherein the first end of the bugle tube comprises an outer dimension defined by the outer surface of the bugle wall at the first end and an inner dimension is defined by the first aperture, and wherein the inner dimension is between 0.5 inches and 1.5 inches, inclusive, and wherein the outer dimension is between 1 to 2 inches, inclusive.

9. The game call of claim 1, further comprising a mouthpiece adapted to removably attach to the first end of the bugle tube.

10. The game call of claim 9, wherein the mouthpiece comprises a non-metallic material.

11. The game call of claim 9, wherein the mouthpiece comprises a first end comprising a first end aperture, a second end comprising a second end aperture, and a central cavity extending from the first end aperture to the second end aperture, wherein a diameter of the central cavity between the first end and the second end is less than a diameter of the first end aperture and less than a diameter of the second end aperture.

12. The game call of claim 9, wherein the mouthpiece comprises a first end comprising a first end aperture, a second end comprising a second end aperture, and a central cavity extending from the first end aperture to the second end aperture, and wherein the first end comprises a diaphragm support configured to house a diaphragm frame within the mouthpiece.

13. The game call of claim 12, wherein the central cavity comprises a first portion between the first end and the second end and a second portion between the first portion and the second end, and wherein a diameter of the second portion is greater than a diameter of the first portion.

14. The game call of claim 13, wherein the first portion comprises a collar extending into the second portion.

15. The game call of claim 1, further comprising an end cap adapted to removably attach to the second end of the bugle tube, the end cap comprising a flange defining an end cap aperture and a sidewall extending downwardly from the flange, wherein the sidewall of the end cap is adapted to be inserted into the second aperture at the second end of the bugle tube.

16. The game call of claim 15, wherein the flange comprises an inner perimeter that defines the end cap aperture and an outer perimeter, and wherein the sidewall extends downwardly from the flange at a location between the inner perimeter and the outer perimeter.

17. The game call of claim 16, wherein a diameter of the inner perimeter is less than an inner dimension of the second end of the bugle tube defined by the second aperture, and wherein a diameter of the outer perimeter is greater than an outer dimension defined by the outer surface of the bugle wall at the second end of the bugle tube.

18. The game call of claim 15, wherein the end cap comprises a non-metallic material.

19. A game call comprising:
   a bugle tube having a length and comprising:
      a first end comprising a first aperture;
      a second end opposite from the first end and comprising a second aperture;
      a bugle wall extending from the first end to the second end and comprising an inner surface and an outer surface, wherein the inner surface defines an interior volume, wherein the first aperture and the second aperture provide access to the interior volume, wherein a flow path is defined through the bugle tube from the first end, through the interior volume, and out the second end, and wherein the bugle tube is configured to generate sound waves by vibrating responsive to air flowing along the flow path,
      wherein:
         the bugle wall is formed of aluminum;
         the first end of the bugle tube comprises a first end outer dimension defined by the outer surface of the bugle wall at the first end and a first end inner dimension defined by the first aperture; and
         the second end of the bugle tube comprises a second end outer dimension defined by the outer surface of the bugle wall at the second end and a second end inner dimension defined by the second aperture;
         the second end outer dimension is greater than the first end outer dimension; and
         the second end inner dimension is greater than the first end inner dimension; and
   a damper formed of a rubber or foam material and surrounding at least a portion of the outer surface of the bugle wall between the first end and the second end of the bugle tube, wherein the damper is adapted to dampen vibrations of the bugle tube in use,
   wherein the game call comprises a resonance frequency of greater than 1300 Hz.

20. The game call of claim 19, wherein a distance from the first end to the second end defines a length of the wild game call, and wherein the length of the wild game call is from about 16 inches to about 20 inches.

21. The game call of claim 20, wherein the length of the wild game call is from about 16 inches to about 18 inches.

22. The game call of claim 19, wherein:
   the first end outer dimension is between 1 to 2 inches, inclusive;
   the first end inner dimension is between 0.75 inches and 1.25 inches, inclusive;
   the second end outer dimension is between 2.5 to 4 inches, inclusive; and
   the second end inner dimension is between 2 to 3.5 inches, inclusive.

23. The game call of claim 19, further comprising at least one of a mouthpiece adapted to removably attach to the first end of the bugle tube or an end cap adapted to removably attach to the second end of the bugle tube, wherein the at least one of the mouthpiece or the end cap is formed of a non-metallic material.

24. A game call comprising:
   a bugle tube comprising:
      a first end comprising a first aperture;
      a second end opposite from the first end and comprising a second aperture;
      a bugle wall extending from the first end to the second end and comprising an inner surface and an outer surface, wherein the inner surface defines an interior volume, wherein the first aperture and the second aperture provide access to the interior volume, wherein a flow path is defined through the bugle tube from the first end, through the interior volume, and out the second end, and wherein the bugle tube is configured to generate sound waves by vibrating responsive to air flowing along the flow path,
      wherein the bugle wall is formed of a metal;
   a damper surrounding at least a portion of the outer surface of the bugle wall between the first end and the second end of the bugle tube, wherein the damper is adapted to dampen vibrations of the bugle tube in use; and
   a mouthpiece adapted to removably attach to the first end of the bugle tube,
   wherein the mouthpiece comprises a first end comprising a first end aperture, a second end comprising a second end aperture, and a central cavity extending from the first end aperture to the second end aperture, and
   wherein a diameter of the central cavity between the first end and the second end is less than a diameter of the first end aperture and less than a diameter of the second end aperture.

25. A game call comprising:
   a bugle tube comprising:
      a first end comprising a first aperture;
      a second end opposite from the first end and comprising a second aperture;
      a bugle wall extending from the first end to the second end and comprising an inner surface and an outer surface, wherein the inner surface defines an interior volume, wherein the first aperture and the second aperture provide access to the interior volume, wherein a flow path is defined through the bugle tube from the first end, through the interior volume, and out the second end, and wherein the bugle tube is configured to generate sound waves by vibrating responsive to air flowing along the flow path,
      wherein the bugle wall is formed of a metal;
   a damper surrounding at least a portion of the outer surface of the bugle wall between the first end and the second end of the bugle tube, wherein the damper is adapted to dampen vibrations of the bugle tube in use; and
   a mouthpiece adapted to removably attach to the first end of the bugle tube,
   wherein the mouthpiece comprises a first end comprising a first end aperture, a second end comprising a second end aperture, and a central cavity extending from the first end aperture to the second end aperture,
   wherein the first end comprises a diaphragm support configured to house a diaphragm frame within the mouthpiece, wherein the central cavity comprises a first portion between the first end and the second end and a second portion between the first portion and the second end, and wherein a diameter of the second portion is greater than a diameter of the first portion.

26. A game call comprising:

a bugle tube comprising:
- a first end comprising a first aperture;
- a second end opposite from the first end and comprising a second aperture;
- a bugle wall extending from the first end to the second end and comprising an inner surface and an outer surface, wherein the inner surface defines an interior volume, wherein the first aperture and the second aperture provide access to the interior volume, wherein a flow path is defined through the bugle tube from the first end, through the interior volume, and out the second end, and wherein the bugle tube is configured to generate sound waves by vibrating responsive to air flowing along the flow path,
- wherein the bugle wall is formed of a metal;

a damper surrounding at least a portion of the outer surface of the bugle wall between the first end and the second end of the bugle tube, wherein the damper is adapted to dampen vibrations of the bugle tube in use; and an end cap adapted to removably attach to the second end of the bugle tube, the end cap comprising a flange defining an end cap aperture and a sidewall extending downwardly from the flange, wherein the sidewall of the end cap is adapted to be inserted into the second aperture at the second end of the bugle tube.

* * * * *